Oct. 7, 1969  C. A. MILLER, JR., ET AL  3,471,028
MICROFILTER UNIT
Filed Aug. 21, 1967

INVENTORS
CHARLES A. MILLER, JR.
JOSEPH B. MASASCHI
ROBERT W. MILLER, JR.
BY
ATTORNEY 3,471,028
MICROFILTER UNIT
Charles A. Miller, Jr., Joseph B. Masaschi, and Robert W. Miller, Jr., Baltimore County, Md., assignors to Filterite Corporation, Timonium, Md., a corporation of Maryland
Filed Aug. 21, 1967, Ser. No. 662,011
Int. Cl. B01d 27/00, 29/24
U.S. Cl. 210—457          1 Claim

ABSTRACT OF THE DISCLOSURE

A filter element having a central perforated tubular core, a protective cover layer surrounding the core, a layer of ultra-fine filtration medium surrounding the core cover, a layer of fine filtration medium surrounding the ultra-fine filtration medium layer and a relatively thick wound yarn layer surrounding the fine filtration medium layer.

---

This invention relates generally to liquid filters and more specifically to such filters which utilize one or more tubular filter elements and the liquid to be filtered is passed through the filter elements from the outside toward the center thereof.

This invention deals specifically with the structure of a tubular filter element per se for use in a filter of the type above outlined.

It is an object of this invention to produce a filter element which will remove even the smallest particles from the liquid to be filtered and yet provide relatively free flow of the fluid therethrough.

It is another object to produce such a filter element which will provide long useful life before clogging necessitates replacement of the element.

These and other objects and advantages will become more apparent as this description proceeds and reference is had to the accompanying drawing forming a part of this specification, wherein like characters of reference refer to the same or similar parts in the several views.

Figure 1:
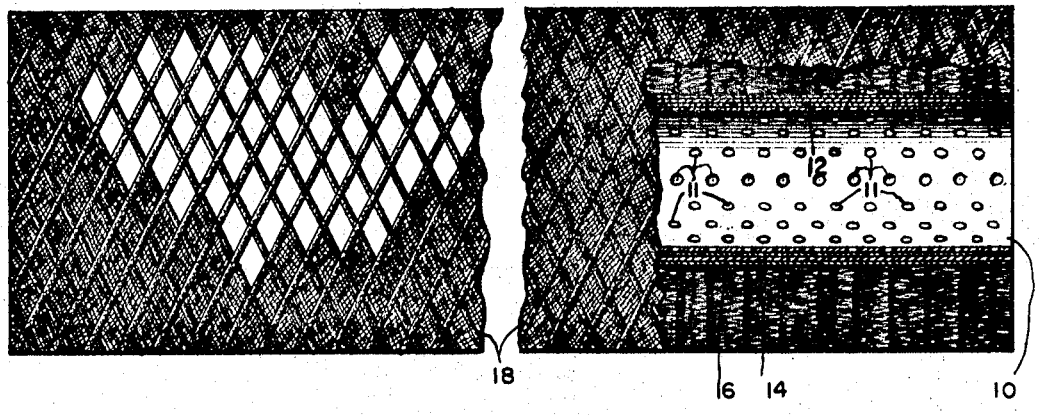
FIGURE 1 is a side elevational view, partly in section of a filter element incorporating my invention.
Figure 2:
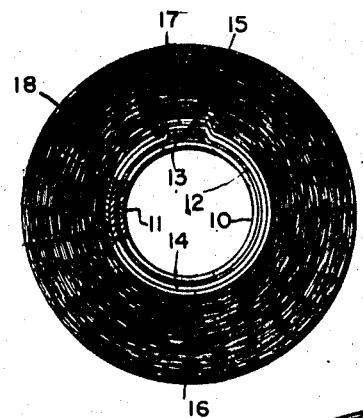
FIGURE 2 is an end view.
Figure 3:
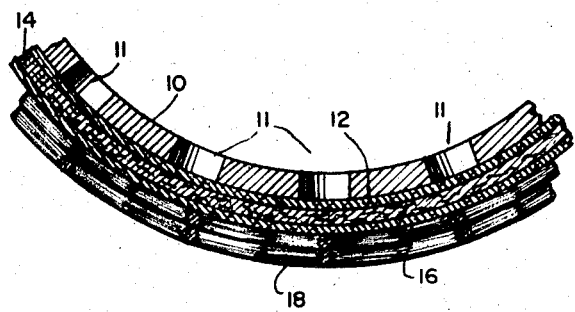
FIG. 3 is a fragmentary enlarged sectional view taken transversely of the axis of the element.

Referring to the drawings in detail, 10 is a tubular core member of generally rigid or self-sustaining material such as metal, plastic or the like having a plurality of perforations 11 therethrough.

Figure 4:
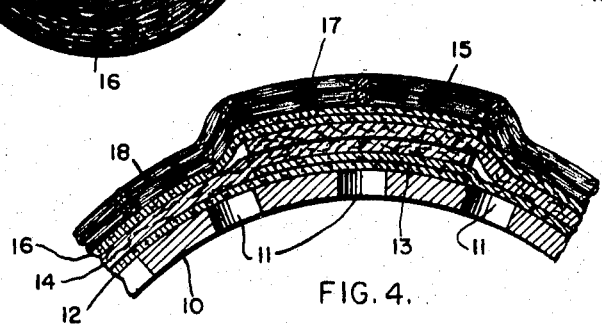
FIGURE 4 is a view similar to FIGURE 3 taken at the point of lap of the various inner layers of filter material.

The core 10 is surrounded, as by wrapping, with a layer 12 of fine filtration medium forming a cover for the core. To insure complete coverage of the core with layer 12 the ends thereof are overlapped as seen at 13 in FIGURE 4.

A layer of ultra-fine filtration material 14 is wrapped about the core cover 12 and is overlapped at 15 similar to the overlap 13 in core cover 12.

A second layer 16 of fine filter material is then wrapped about the ultra-fine filter layer 14 and the ends are overlapped at 17.

A final layer 18 of spirally wound yarn is then wrapped about the layer 16 to the thickness required. The spiral winding produces small diamond-shaped openings allowing passage of fluid therethrough and the nap of the yarn projects from the yarn strands into these openings to arrest the larger particles in the fluid, leaving the fine filtering to the layers 16, 14 and 12 as the liquid flows through the filter.

Having thus described a preferred embodiment of our invention it is to be understood that we do not wish to be limited specifically thereto but desire to include all forms reasonably permitted by the state of the prior art and as fall within the definition of the following claim.

We claim:
1. A filter element comprising:
   (a) a rigid tubular perforated core element,
   (b) a core covering in the form of a single layer of fine fibrous filter material surrounding the core element, said single layer having its ends overlapped,
   (c) a single layer of ultra-fine fibrous filter material surrounding the core covering and having its ends overlapped,
   (d) a second single layer of fine fibrous filter material surrounding the ultra-fine filter layer and having its ends overlapped, and
   (e) an outer layer of relatively coarse filter material located on the upstream side of the filter element and surrounding the second layer of fine filter material, said outer layer formed of a plurality of turns of spirally wound napped yarn.

References Cited
UNITED STATES PATENTS

| | | | |
|---|---|---|---|
| 2,203,815 | 6/1940 | Dahl et al. | 210—457 X |
| 2,911,101 | 11/1959 | Robinson | 210—458 |
| 3,334,752 | 9/1967 | Matravers | 210—457 |
| 3,399,092 | 8/1968 | Adams et al. | 210—457 X |

REUBEN FRIEDMAN, Primary Examiner

T. A. GRANGER, Assistant Examiner

U.S. Cl. X.R.
210—489